United States Patent
Hericher et al.

(10) Patent No.: US 12,000,024 B2
(45) Date of Patent: *Jun. 4, 2024

(54) ALLOY FOR FIBER-FORMING PLATE

(71) Applicants: SAINT-GOBAIN ISOVER, Courbevoie (FR); SAINT-GOBAIN SEVA, Chalon-sur-Saone (FR)

(72) Inventors: Ludovic Hericher, Chalon sur Saone (FR); Jacques Labarthe, Montmorency (FR); Cyril Condolf, Conflans-Sainte-Honorine (FR)

(73) Assignees: SAINT-GOBAIN ISOVER, Courbevoie (FR); SAINT-GOBAIN SEVA, Chalon-sur-Saone (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,373

(22) Filed: Apr. 27, 2023

(65) Prior Publication Data

US 2023/0287541 A1 Sep. 14, 2023

Related U.S. Application Data

(63) Continuation of application No. 17/900,136, filed on Aug. 31, 2022, now Pat. No. 11,667,993, which is a continuation of application No. 17/273,149, filed as application No. PCT/FR2019/052091 on Sep. 10, 2019, now Pat. No. 11,505,849.

(30) Foreign Application Priority Data

Sep. 13, 2018 (FR) ...................................... 1858208

(51) Int. Cl.
*C22C 19/05* (2006.01)
*C03B 37/04* (2006.01)

(52) U.S. Cl.
CPC .......... *C22C 19/055* (2013.01); *C03B 37/047* (2013.01)

(58) Field of Classification Search
CPC ........ C22C 19/056; C22C 19/055; C22F 1/10
See application file for complete search history.

(56) References Cited

U.S. PATENT DOCUMENTS 11,505,849 B2 11/2022 Hericher et al.

FOREIGN PATENT DOCUMENTS

| CN | 106244856 A | 12/2016 |
|---|---|---|
| DE | 20 2014 105808 U1 | 12/2014 |
| EP | 0 081 091 A2 | 6/1983 |
| FR | 2 675 818 A1 | 10/1992 |
| WO | WO 88/09393 A1 | 12/1988 |
| WO | WO 2018/158509 A1 | 9/2018 |

OTHER PUBLICATIONS

International Search Report as issued in International Patent Application No. PCT/FR2019/052091, dated Nov. 21, 2019.
First Office Action as issued in Chinese Patent Application No. 201980057560.1, dated Oct. 14, 2021.

*Primary Examiner* — Jessee R Roe
(74) *Attorney, Agent, or Firm* — Pillsbury Winthrop Shaw Pittman LLP

(57) ABSTRACT

An article for the conversion of glass, the article being made of an alloy that contains the following elements, the proportions being indicated as percentage by weight of the alloy (limit values included): Cr 20 to 35%, Fe 1 to 6%, W 3 to 8%, Nb 0.5 to 3%, Ti 0 to 1%, C 0.4 to 1%, Co 0 to 3%, Si 0.1 to 1.5%, Mn 0.1 to 1%, the remainder being nickel and unavoidable impurities.

22 Claims, No Drawings

ALLOY FOR FIBER-FORMING PLATE

CROSS-REFERENCE TO RELATED APPLICATIONS

This application is a continuation of U.S. application Ser. No. 17/900,136, filed on Aug. 31, 2022, now U.S. Pat. No. 11,667,993, which is a continuation of U.S. application Ser. No. 17/273,149 filed on Mar. 3, 2021, now U.S. Pat. No. 11,505,849, which is the U.S. National Stage of PCT/FR2019/052091, filed on Sep. 10, 2019, which in turn claims priority to French patent application number 1858208 filed on Sep. 13, 2018. The content of these applications are incorporated herein by reference in the entireties.

FIELD

The present invention relates to a metal alloy for use at very high temperature, in particular which can be used in a process for manufacturing mineral wool by fiberizing a molten mineral composition, or more generally for the formation of tools with mechanical strength at high temperature in an oxidizing environment, such as molten glass, and to nickel-based alloys which can be used at high temperature, especially for the manufacture of articles for the smelting and/or hot conversion of glass or other mineral material, such as components of machines for the manufacture of mineral wool.

SUMMARY

One fiberizing technique, known as by internal centrifugation, consists in allowing liquid glass to fall continuously inside an assembly of axisymmetric parts rotating at a very high rotational speed around their vertical axis. One key part, known as "spinner", receives the glass against a wall referred to as "band" pierced with holes through which the glass passes under the effect of the centrifugal force in order to escape from all parts thereof in the form of molten filaments. An annular burner located above the outside of the spinner, which produces a descending gas stream tightly surrounding the external wall of the band, deflects these filaments downward, drawing them. Said filaments subsequently "solidify" in the form of glass wool.

The spinner is a fiberizing tool which is highly stressed thermally (heat shocks during startup and shutdown operations, and establishment, in stabilized use, of a temperature gradient along the part), mechanically (centrifugal force, erosion due to the passage of the glass) and chemically (oxidation and corrosion by the molten glass, and by the hot gases emerging from the burner around the spinner). Its main modes of deterioration are: hot creep deformation of the vertical walls, the appearance of horizontal or vertical cracks and wear by erosion of the fiberizing orifices, which require the outright replacement of the components. Their constituent material must thus resist for a sufficiently long production time (or fiberizing time) to remain compatible with the technical and economic constraints of the process. To this end, materials having a degree of ductility, creep resistance and resistance to corrosion by molten glass and to oxidation at high temperature are sought.

Nickel-based superalloys reinforced by precipitation of carbides are known for the production of these tools. FR 2675818 describes such alloys, for example.

SUMMARY

The present invention aims to provide nickel-based alloys which are further improved, ultimately making it possible to increase the lifetime of the tool formed from said alloy, especially a fiberizing spinner made of such an alloy. The alloy according to the present invention thus has very good properties of creep resistance, resistance to corrosion and/or oxidation, which ultimately make it possible to obtain such an improved lifetime.

More specifically, a subject of the present invention is an alloy which contains the following elements, the proportions being indicated as percentage by weight of the alloy (limit values included):

| | |
|---|---|
| Cr | 20 to 35% |
| Fe | 0 to 6% |
| W | 3 to 8% |
| Nb | 0.5 to 3% |
| Ti | 0 to 1% |
| C | 0.4 to 1% |
| Co | 0 to 3% |
| Si | 0.1 to 1.5% |
| Mn | 0.1 to 1% | the remainder consisting of nickel and unavoidable impurities.

DETAILED DESCRIPTION

For the purposes of the present invention, unavoidable impurities is intended to mean that the elements in question are not intentionally present in the composition of the alloy but that they are introduced in the form of impurities present in at least one of the main elements of the alloy (or in at least one of the precursors of said main elements).

The alloy according to the present invention differs from the nickel-based alloys generally used for such applications especially in that it contains niobium carbides (NbC) and optionally titanium carbides (TiC), and also a limited amount of iron, or even no iron, or iron solely in the form of unavoidable impurities.

Patent application FR2675818, cited above, indicates that an amount of iron of between 7 and 10% in nickel-based alloys is necessary in order to improve the resistance to corrosion with regard to the molten glass, especially with regard to the sulfur-containing compounds contained in said molten glass. Unexpectedly, and even counter to what could be expected, the properties of the alloy compositions according to the present invention, that is to say having a proportion of iron much lower than that previously described (or even having no iron or iron solely in the form of unavoidable impurities) appeared superior to those of the alloys of the prior art and in particular, the lifetime of the spinners made from such an alloy proved to be greater, as will be demonstrated in the remainder of the description by the examples provided.

Among the elements forming part of the composition of the alloy, mention may especially be made of (all the percentages being given relative to the total weight of the alloy):

Nickel is the base element of the alloys according to the invention, in that it represents more than 50% by weight of the alloy. The nickel content is preferably greater than or equal to 52%, or even greater than or equal to 54%. More preferably still, the nickel content is greater than 55%, or even greater than or equal to 56%. More preferably still, the nickel content is less than or equal to 65%, or even less than or equal to 63%, or even less than or equal to 62%. The alloy may very preferentially comprise a range of between 55.5 and 60% by weight of nickel, or even between 56 and 60% by weight of nickel.

Carbon is an essential constituent of the alloy, necessary for formation of metal carbide precipitates. In particular, the carbon content directly determines the amount of carbides present in the alloy. It is at least 0.4% by weight, in order to obtain the desired minimum reinforcement, preferably at least 0.5% by weight, but preferentially limited to at most 1% by weight, preferably of at most 0.9% by weight, or even at most 0.8% by weight, in order to prevent the alloy from becoming hard and difficult to machine due to an excessively high density of reinforcements. The lack of ductility of the alloy at such contents prevents it from accommodating, without fracturing, an imposed deformation (for example of thermal origin) and from being sufficiently resistant to the propagation of cracks. The alloy may very preferentially comprise a range of between 0.6 and 0.7% by weight of carbon. Most particularly, an alloy according to the invention that has demonstrated very good performance in the meaning described previously comprises between 0.55 and 1% by weight of carbon.

Chromium contributes to the intrinsic mechanical strength of the matrix in which it is present partly in solid solution and, in some cases, also in the form of carbides essentially of $Cr_{23}C_6$ type in fine dispersion inside the grains, where they provide resistance to intergranular creep, or in the form of carbides of $Cr_7C_3$ or $Cr_{23}C_6$ type present at the grain boundaries, which prevent grain on grain slipping, thus also contributing to the intergranular strengthening of the alloy. Chromium contributes to the resistance to corrosion as precursor of chromium oxide, which forms a protective layer at the surface exposed to the oxidizing environment. A minimum amount of chromium is therefore necessary for the formation and the maintenance of this protective layer. However, an excessively high chromium content is harmful to the mechanical strength and to the toughness at high temperatures as it results in an excessively high stiffness and an excessively low ability to be elongated under stress incompatible with high-temperature stresses. Preferably, the chromium content of an alloy which can be used according to the invention is greater than or equal to 22%, or even greater than or equal to 25%, or even greater than or equal to 28%. Preferably, the chromium content of an alloy which can be used according to the invention is less than or equal to 32%, or even less than or equal to 30%.

The alloy may very preferentially comprise a range of between 28 and 30% by weight of chromium.

According to the experiments carried out by the applicant company, niobium, like titanium, appears to contribute to the mechanical strength of the alloy, in particular to the creep resistance, at high temperature, for example greater than 1000° C., or even greater than 1040° C. This is because chromium carbides have a tendency to dissolve at temperatures of greater than 1000° C. The presence of niobium carbides and titanium carbides, which are more stable than chromium carbides at high temperature, makes it possible to ensure the mechanical strength of the alloy at high temperature. Moreover, the migration of the chromium at the surface to form the protective chromine layer required to for the corrosion resistance induces a local decrease in the chromium at the subsurface and therefore a disappearance of the carbides $Cr_7C_3$ and $Cr_{23}C_6$. The presence of NbC carbides contributes to maintaining the mechanical properties during the disappearance of the chromium carbides. The niobium content is preferably greater than or equal to 0.6%, or even greater than or equal to 0.7%. More preferably still, the niobium content is less than or equal to 2.5%, or even less than or equal to 2%, or even less than or equal to 1.5%, and very preferably less than 1.2%, or even less than 1.15%.

The alloy may very preferentially comprise a range of between 0.8 and 1.2% by weight of niobium.

A certain proportion of titanium may also contribute to the mechanical strength of the alloy at high temperature by the formation of titanium carbides. However, it has been noted that the presence of titanium could affect the resistance to oxidation of the alloy. Thus, the titanium content is preferably less than 0.5%, or even less than 0.4% by weight. In a particularly preferred embodiment, the alloy does not comprise titanium other than in the form of unavoidable impurity, that is to say at contents of less than 0.1%, or even of less than 0.05% or even of less than 0.01% by weight of the alloy.

The (Nb+Ti)/C weight ratio according to the invention is preferably between 1 and 2, more preferentially between 1.5 and 2. The (Nb+Ti)/C weight ratio according to the invention is in particular between 1.5 and 2.4.

Tungsten also contributes, together with the other metals present in the alloy and mentioned previously, to the hardness of the alloy and to its creep resistance.

Tungsten is present in an amount greater than or equal to 3%, more preferably still greater than or equal to 4%, or even greater than or equal to 5% by weight of the alloy. Tungsten is preferably present in an amount less than or equal to 7%, more preferably still less than or equal to 6% by weight of the alloy.

The alloy may comprise for example from 3 to 8%, 4 to 7%, and very preferentially between 5 and 6% by weight of tungsten.

Cobalt may be present in the alloy in the form of a solid solution with nickel. It is very commonly used in the field of high temperature refractory steels in refractory alloys because it is known that such a solid solution contributes to the corrosion resistance and the mechanical strength of the overall alloy. However, as cobalt is an expensive element, it is deliberately limited according to the invention and present in an amount of less than 3%, or even less than 2%, or even less than 1% by weight of the alloy. Surprisingly, although the presence of a sufficient amount of cobalt is considered to be a requirement in the field of refractory alloys comprising nickel in order to stabilize the latter, it has been found by the applicant company that, in the specific case of the alloy which is the subject of the present invention, it is possible to limit its presence as far as possible, in particular to limit its presence solely in the form of unavoidable impurities. Most generally, the tests carried out by the applicant showed that the cobalt was nonetheless virtually always present in the alloy in the form of unavoidable impurity at an amount of at least 0.3% by weight and most commonly at least 0.5% by weight, or even at least 0.7% by weight. Percentages of cobalt in the alloy of less than 0.3% by weight, or even less than the detection thresholds, must however also be considered as being included in the context of the invention.

As indicated above, the amount of iron, considered to be an essential element in the prior art document FR2675818, is also limited in the present invention. The iron content is preferably less than or equal to 5%, or even less than or equal to 4.5%, or even less than or equal to 4%.

According to one embodiment of the invention, the iron content is greater than or equal to 1%, or even greater than or equal to 2%, or even greater than or equal to 3%.

According to another embodiment of the invention, the iron may only be present in the form of unavoidable impurities.

According to another possible embodiment, the iron content is between 4% and 6% by weight.

The alloy may advantageously contain other elements in very minor proportions. It comprises in particular:
- silicon, as deoxidant for the molten metal during the smelting and molding of the alloy, preferably at an amount of less than 1.1%, or even less than 0.9%, or even less than 0.8% by weight;
- manganese, also as deoxidant, preferentially at an amount of less than 0.9%, or even less than 0.6% by weight.

The cumulative amount of the other elements introduced as impurities with the essential constituents of the alloy ("unavoidable impurities") advantageously represents less than 2% by weight of the composition of the alloy, or even less than 1% by weight of the alloy.

Among the possible, and common, unavoidable impurities, mention may be made of sulfur or phosphorus. The individual amount thereof generally does not exceed 0.05% in the alloys according to the invention.

The alloy according to the present invention also differs from certain nickel-based alloys generally used for the manufacture of fiberizing spinners in that it does not contain aluminum other than in the form of unavoidable impurity, that is to say at contents of less than 0.1%, or even less than 0.05%, or even less than 0.01% by weight. This is because it has been noted that the presence of aluminum in the alloy, even at a low amount of the order of 0.1% by weight, could significantly affect its corrosion resistance with regard to the molten glass.

The alloy according to the invention is also devoid of molybdenum, apart from in the form of unavoidable impurity, that is to say that it may comprise contents of less than 0.1%, or even of less than 0.05% or even of less than 0.01% by weight of molybdenum. This is because, although molybdenum is known to provide nickel-based alloys with excellent corrosion resistance, it has been observed that, even at low contents, molybdenum could considerably affect their resistance to oxidation.

In a particular embodiment, the alloy according to the invention comprises, as percentage by weight:

| | | |
|---|---|---|
| Cr | 22 to 31%, | preferably 28 to 30%, |
| Fe | 0 to 6%, | preferably 3 to 4%, |
| W | 4 to 7%, | preferably 5 to 6%, |
| Nb | 0.5 to 3%, | preferably 0.8 to 1.2%, |
| Ti | 0 to 0.5%, | preferably 0.1 to 0.3%, |
| C | 0.45 to 0.9%, | preferably 0.6 to 0.7%, |
| Co | less than 3%, | preferably less than 1%, |
| Si | less than 1.1%, | preferably 0.6 to 0.8%, |
| Mn | less than 0.8%, | preferably 0.5 to 0.7%, | the remainder consisting of nickel and unavoidable impurities. In particular, nickel may advantageously be present in amounts ranging from 54 to 62% by weight and in particular ranging from 55 to 60% by weight.

The alloys which can be used according to the invention, which contain highly reactive elements, can be formed by founding, in particular by inductive melting under an at least partially inert atmosphere and sand mold casting.

The casting can optionally be followed by a heat treatment.

Another subject of the invention is a process for the manufacture of an article by founding, using the alloys described above as subject of the invention.

The process generally comprises a step of appropriate heat treatment which makes it possible to obtain secondary carbides and makes possible their homogeneous distribution in the metal matrix, as described in FR 2675818. The heat treatment is preferably carried out at a temperature of less than 1000° C., or even of less than 950° C., for example from 800° C. to 900° C., for a period of at least 5 hours, or even at least 8 hours, for example from 10 to 20 hours.

The process may comprise at least one cooling stage, after the casting and/or after or in the course of a heat treatment, for example by cooling in the air, in particular with a return to ambient temperature.

The alloys which are subjects of the invention can be used to manufacture all kinds of parts which are mechanically stressed at high temperature and/or caused to operate in an oxidizing or corrosive environment. Other subjects of the invention are such articles manufactured from an alloy according to the invention, especially by founding.

Mention may especially be made, among such applications, of the manufacture of articles which can be used for the smelting or the hot conversion of glass, for example fiberizing spinners for the manufacture of mineral wool.

Thus, another subject of the invention is a process for manufacturing mineral wool by internal centrifugation, in which a flow of molten mineral material is poured into a fiberizing spinner, the peripheral band of which is pierced with a multitude of orifices through which filaments of molten mineral material escape and are subsequently drawn to give wool under the action of a gas, the temperature of the mineral material in the spinner being at least 900° C., or even at least 950° C. or at least 1000° C., or even at least 1040° C., and the fiberizing spinner consisting of an alloy as defined above.

The alloys according to the invention therefore make it possible to fiberize a molten mineral material having a liquidus temperature ($T_{liq}$) of 800° C. or more, for example of 850° C., or even 900° C. to 1030° C., or even 1000° C., or even 950° C.

The composition of the mineral material to be fiberized is not particularly limited as long as it can be fiberized by an internal centrifugation process. It can vary as a function of the properties desired for the mineral fibers produced, for example biosolubility, fire resistance or thermal insulation properties. The material to be fiberized is preferably a glass composition of soda-lime-silica-borate type. It can in particular have a composition which includes the constituents below, in the proportions by weight defined by the following limits:

| | |
|---|---|
| $SiO_2$ | 35 to 80%, |
| $Al_2O_3$ | 0 to 30%, |
| $CaO + MgO$ | 2 to 35%, |
| $Na_2O + K_2O$ | 0 to 20%, | it being understood that in general
$SiO_2+Al_2O_3$ is within the range extending from 50 to 80% by weight and that $Na_2O+K_2O+B_2O_3$ is within the range extending from 5 to 30% by weight.

The material to be fiberized may especially have the following composition, in percentage by weight:

| | |
|---|---|
| $SiO_2$ | 50 to 75%, |
| $Al_2O_3$ | 0 to 8%, |
| $CaO + MgO$ | 2 to 20%, |
| $Fe_2O_3$ | 0 to 3%, |
| $Na_2O + K_2O$ | 12 to 20%, |
| $B_2O_3$ | 2 to 10%. |

The material to be fiberized can be prepared from pure constituents but it is generally obtained by melting a mixture of natural starting materials that provide different impurities.

Although the invention has been described mainly in the context of the manufacture of mineral wool, it can be applied to the glass industry in general for producing furnace, bushing or feeder components or fittings, in particular for the production of yarns of textile glass, of packaging glass, and the like.

Outside the glass industry, the invention can be applied to the manufacture of a very wide variety of articles, when the latter must have high mechanical strength in an oxidizing and/or corrosive environment, in particular at high temperature.

The examples which follow, which are in no way restrictive of the compositions according to the invention or of the conditions for employing the fiberizing spinners according to the invention, illustrate the advantages of the present invention.

EXAMPLES

A molten charge of a composition I1 (according to the invention) and C1 (according to FR 2675818) which are indicated in table 1 is prepared by the inductive melting technique under an inert atmosphere (in particular argon), which molten charge is subsequently formed by simple casting in a sand mold. Table 1 indicates the proportions as percentage by weight of each element in the alloy, the remainder to 100% consisting of nickel and unavoidable impurities.

TABLE 1

|    | I1    | C1   |
|----|-------|------|
| Cr | 27.1  | 27.5 |
| Fe | 5.45  | 7    |
| W  | 5.83  | 7.2  |
| Nb | 0.86  | —    |
| Ti | 0.14  | —    |
| C  | 0.62  | 0.67 |
| Co | 0.78  | 0.80 |
| Si | 0.79  | 0.75 |
| Mn | 0.70  | 0.75 |

* optionally present in the form of unavoidable impurity

The casting is followed by a heat treatment for precipitation of the secondary carbides at 865° C. for 12 hours, finishing with a cooling in air down to ambient temperature.

In this way, 200×110×25 mm ingots were manufactured.

The properties of resistance to creep, to oxidation and to corrosion of the alloys I1 and C1 were subsequently evaluated.

The resistance to creep was measured by a creep-traction test on test specimens 30.0 mm long, 8.0 mm wide and 2.0 mm thick. The tests were carried out at 1000° C. (normal operating temperature of a spinner), under loads of 45 MPa (corresponding to a normal stressing of the spinner), 63 MPa (corresponding to an extreme stressing of the spinner) and 100 MPa. Table 2 indicates the creep rate (in the secondary mode) in μm/h.

The resistance to oxidation depends, on the one hand, on the kinetics of oxidation of the alloy and, on the other hand, on the quality of adhesion of the oxide layer formed on the surface of the alloy. This is because poor adhesion of the oxide layer to the surface of the alloy accelerates oxidation of the latter: when the oxide layer comes off, a nonoxidized alloy surface is then exposed directly to the oxygen of the air, which brings about the formation of a new oxide layer, in its turn capable of coming off, thus propagating the oxidation. On the other hand, when the oxide layer remains adherent to the surface of the alloy, it forms a barrier layer which limits, indeed even halts, the progression of the oxidation. The oxidation rate constants Kp, expressed in $g \cdot cm^{-2} \cdot s^{-1/2}$, were calculated from monitoring the increase in weight resulting from the oxidation of samples placed at 1000° C. for 50 h in a furnace equipped with a microbalance under a stream of air. Table 2 indicates these constants in $g \cdot cm^{-2} \cdot s^{-1/2}$.

The tests of resistance to corrosion are carried out using a three-electrode assembly, which electrodes are immersed in a rhodium/platinum crucible containing the molten glass. The rhodium/platinum crucible is used as counterelectrode. The comparison electrode is conventionally the air-fed stabilized zirconia electrode. The cylindrical samples of alloys to be evaluated, which underwent a heat treatment in air at 1000° C. for 2 h, are sealed with zirconia cement to an alumina sheath to form the working electrode. The sample constituting the working electrode is fitted to a rotating axis, in order to represent the frictional exertions of the glass on the surface of the alloy, and immersed in the molten glass at 1000° C. (composition as percentage by weight: $SiO_2$ 65.6; $Al_2O_3$ 1.7; $Na_2O$ 16.4; $K_2O$ 0.7; CaO 7.4; MgO 3.1; $B_2O_3$ 4.8). The resistance of the alloys to corrosion by the glass is evaluated by measuring the polarization resistance (Rp). In order to measure the corrosion potential ($E_c$), no current is applied between the working electrode and the counterelectrode, and the potential measured between the working electrode and the comparison electrode is that of the metal/glass pair at the given temperature. This thermodynamic information makes it possible to determine the corrosion reactions and the passivable nature of the metal studied. The measurement of the polarization resistance (Rp) is obtained by periodically varying the electric potential in the vicinity of the potential $E_c$ and by measuring the change in the current density which results. The slope of the current/potential curve recorded over this range is inversely proportional to Rp. The greater Rp (expressed in $ohm \cdot cm^2$), the more resistant the material is to corrosion, the rate of degradation being inversely proportional to Rp. The determination of Rp thus makes it possible to evaluate comparatively the rate of corrosion of the alloys.

TABLE 2

|            |                                               |         | I1                  | C1                  |
|------------|-----------------------------------------------|---------|---------------------|---------------------|
| Creep      | 1000° C.                                      | 45 MPa  | 0.38                | 0.72                |
| μm/h       |                                               | 63 MPa  | 1.03                | 2.48                |
|            |                                               | 100 MPa | 32.51               | 54.47               |
| Solidus    | $T_{Solidus}$ (° C.)                          |         | 1292                | 1288                |
| Oxidation  | Kinetic constant Kp ($g \cdot cm^{-2} \cdot s^{-1/2}$) |  | $8.7 \times 10^{-12}$ | $5.5 \times 10^{-12}$ |
| Corrosion  | Polarization resistance Rp ($Ohm/cm^2$)       |         | 770 ± 15%           | 870 ± 15%           |

Comparing the data reported in table 2, there is observed, for the alloy I1 according to the invention, a significantly improved resistance to creep compared to the alloy C1 and substantially equivalent resistance to corrosion and to oxidation to that of the alloy C1. Moreover, the stability of the NbC carbides during the chromium migration process makes it possible to retain the mechanical properties required for the good resistance of the material and will be fully appreciated when analyzing the results of the application of this alloy to fiberizing spinners.

Fiberizing spinners, respectively of diameter 400 mm and 600 mm, are subsequently formed with the alloy according to the prior art C1 and with the alloy I1 according to the invention.

The spinners are prepared by the inductive melting technique under an inert argon atmosphere: a molten charge of the chosen composition (i.e. I1 or C1, see table 1 above) is prepared, which molten charge is subsequently formed by simple casting in a sand mold.

The casting is followed by a heat treatment of 12 hours at 865° C. for precipitation of the secondary carbides. This treatment is followed by quenching with blown air.

In this way, series of fiberizing spinners of diameter 400 mm and 600 mm are manufactured in the two alloys.

The capacity of the spinners thus formed was evaluated in the application of glass wool fiberizing. More specifically, the spinners were placed in an industrial line for fiberizing a glass of the composition (in percentage by weight):

| $SiO_2$ | $Al_2O_3$ | $(B_2O_3)$ | CaO | MgO | $Na_2O$ | $K_2O$ | Others |
|---|---|---|---|---|---|---|---|
| 65.3 | 2.1 | 4.5 | 8.1 | 2.4 | 16.4 | 0.7 | 0.5 |

This is a glass with a liquidus temperature of 900° C.

The spinners are used until their stoppage is dictated following the ruin of the spinner, observed by visible deterioration on said spinner or by a quality of fiber produced becoming insufficient.

The lifetimes of the spinners are reported in table 1. The results are indicated as tons of fiberized material before the spinner is ruined. The results reported in table 3 are a mean taken across at least three spinners from each category.

TABLE 3

| Diameter spinner | Composition spinner | |
|---|---|---|
| | Alloy C1 (comparative) | Alloy I1 (inventive) |
| 400 mm | 170 tons | 225 tons |
| 600 mm | 303 tons | 381 tons |

It can be seen in table 3 that the spinners made with the alloys according to the invention always have the longest lifetimes for comparable conditions of use.

The invention claimed is:

1. An article for the conversion of glass, the article being made of an alloy that contains the following elements, the proportions being indicated as percentage by weight of the alloy (limit values included):

| | |
|---|---|
| Cr | 20 to 35% |
| Fe | 1 to 6% |
| W | 3 to 8% |
| Nb | 0.5 to 3% |
| Ti | 0 to 1% |
| C | 0.4 to 1% |
| Co | 0 to 3% |
| Si | 0.1 to 1.5% |
| Mn | 0.1 to 1% | the remainder consisting of nickel and unavoidable impurities.

2. The article as claimed in claim 1, wherein the alloy contains less than 0.5% by weight of Ti.
3. The article as claimed in claim 2, wherein the alloy contains less than 0.4% by weight of Ti.
4. The article as claimed in claim 1, wherein the alloy contains between 0.6% and 0.9% by weight of carbon.
5. The article as claimed in claim 4, wherein the alloy contains between 0.6 and 0.7% by weight of carbon.
6. The article as claimed in claim 1, wherein a (Nb+Ti)/C ratio is from 1 to 2.4.
7. The article as claimed in claim 6, wherein the (Nb+Ti)/C ratio is from 1 to 2.
8. The article as claimed in claim 1, wherein the alloy contains between 22 and 32% by weight of chromium.
9. The article as claimed in claim 8, wherein the alloy contains between 28 and 30% by weight of chromium.
10. The article as claimed in claim 1, wherein the alloy contains between 3 and 4% by weight of iron.
11. The article as claimed in claim 1, wherein the alloy contains between 4 and 6% by weight of iron.
12. The article as claimed in claim 1, wherein the alloy contains from 0.6 to 2.0% by weight of niobium.
13. The article as claimed in claim 12, wherein the alloy contains from 0.8 to 1.2% by weight of niobium.
14. The article as claimed in claim 1, wherein the alloy contains between 4 and 7% by weight of tungsten.
15. The article as claimed in claim 14, wherein the alloy contains between 5 and 6% by weight of tungsten.
16. The article as claimed in claim 1, wherein the alloy contains less than 2% by weight of cobalt.
17. The article as claimed in claim 16, wherein the alloy contains less than 1% by weight of cobalt.
18. The article as claimed in claim 1, wherein the alloy contains between 55% and 65% by weight of nickel.
19. The article as claimed in claim 18, wherein the alloy contains between 56 and 62% of nickel.
20. The article as claimed in claim 1, wherein the alloy contains less than 1.1% by weight of silicon.
21. An article for the manufacture of mineral wool, the article being made of an alloy that contains the following elements, the proportions being indicated as percentage by weight of the alloy (limit values included):

| | |
|---|---|
| Cr | 20 to 35% |
| Fe | 1 to 6% |
| W | 3 to 8% |
| Nb | 0.5 to 3% |
| Ti | 0 to 1% |
| C | 0.4 to 1% |
| Co | 0 to 3% |
| Si | 0.1 to 1.5% |
| Mn | 0.1 to 1% | the remainder consisting of nickel and unavoidable impurities.

22. A fiberizing spinner for the manufacture of mineral wool, the fiberizing spinner being made of an alloy that contains the following elements, the proportions being indicated as percentage by weight of the alloy (limit values included):

| | |
|---|---|
| Cr | 20 to 35% |
| Fe | 1 to 6% |
| W | 3 to 8% |
| Nb | 0.5 to 3% |
| Ti | 0 to 1% |

| | |
|---|---|
| C | 0.4 to 1% |
| Co | 0 to 3% |
| Si | 0.1 to 1.5% |
| Mn | 0.1 to 1% | the remainder consisting of nickel and unavoidable impurities.

\* \* \* \* \*